United States Patent [19]
Gillis et al.

[11] Patent Number: 5,323,447
[45] Date of Patent: Jun. 21, 1994

[54] APPARATUS AND METHOD FOR MODIFYING A FREQUENCY HOPPING SEQUENCE OF A CORDLESS TELEPHONE OPERATING IN A FREQUENCY HOPPING SYSTEM

[75] Inventors: Mark E. Gillis, Eatontown; Kenneth W. Leland, Toms River; William J. Nealon, Ocean Grove; Hon Yu, Aberdeen, all of N.J.

[73] Assignee: AT&T Bell Laboratories, Murray Hill, N.J.

[21] Appl. No.: 786,639

[22] Filed: Nov. 1, 1991

[51] Int. Cl.[5] .................. H04M 11/00; H03M 13/00; H04Q 7/00
[52] U.S. Cl. .......................... 379/61; 379/62; 371/42; 455/34.2
[58] Field of Search ............. 379/58, 61, 62; 455/34.1, 54.1, 34.2, 51.1, 103; 371/42; 370/100.1; 375/1

[56] References Cited

U.S. PATENT DOCUMENTS

| | | | |
|---|---|---|---|
| 4,731,814 | 3/1988 | Becker et al. | 379/62 |
| 4,736,404 | 4/1988 | Anglikowski et al. | 379/62 |
| 4,768,219 | 8/1988 | Yamagata et al. | 379/61 |
| 4,837,802 | 6/1989 | Higashiyama et al. | 379/62 |
| 4,969,205 | 11/1990 | Itoh | 455/54 |
| 5,023,932 | 6/1991 | Wakana | 455/34 |
| 5,044,010 | 8/1991 | Frenkiel et al. | 379/61 |
| 5,084,891 | 1/1992 | Ariyavistakul et al. | 371/42 |
| 5,115,463 | 5/1992 | Moldavsky et al. | 379/58 |

FOREIGN PATENT DOCUMENTS 0089827  4/1989  Japan ................. 455/34.2

Primary Examiner—Curtis Kuntz
Assistant Examiner—William D. Cumming
Attorney, Agent, or Firm—Samuel R. Williamson

[57] ABSTRACT

A cordless telephone arranged for operation in a frequency hopping system automatically modifies a frequency hopping sequence in the presence of interference detected on its in-use communication channels. Substitute alternative communication channels are identified and then substituted for those communication channels experiencing the interference without disruption of communications between a handset unit in the cordless telephone and its associated base unit.

15 Claims, 3 Drawing Sheets

CHANNEL CHANGE TRANSMISSION FORMAT

APPARATUS AND METHOD FOR MODIFYING A FREQUENCY HOPPING SEQUENCE OF A CORDLESS TELEPHONE OPERATING IN A FREQUENCY HOPPING SYSTEM

BACKGROUND OF THE INVENTION

1. Technical Field

This invention relates to cordless telephones and more particularly to an apparatus and method employed in a cordless telephone for automatically modifying a frequency hopping sequence in the presence of interference.

2. Description of the Prior Art

Recent rulings promulgated by the Federal Communication Commission (FCC) in the utilization of spread spectrum systems, including a frequency hopping system, now allow for increased spectral utilization for cordless telephones. Frequency hopping systems spread their energy by changing, or hopping the center frequency of the transmission many times a second in accordance with a pseudo randomly generated list of communication channels. The result is a significantly higher signal to noise ratio than may be achieved by conventional techniques such as amplitude modulation that uses no bandwidth spreading.

These recent FCC rulings provide general guidance for how cordless telephones may operate in a spread spectrum system. They do not, however, provide specific guidance as to standards required for the compatible operation of these cordless telephones. Because such standards have not yet been adopted for determining the configuration of cordless telephones intended for spread spectrum operation, there is a possibility of interference between cordless telephones operating in different spread spectrum configurations within a frequency band designated for such operation. By way of example, two frequency hopping telephones may be configured to frequency hop at different rates. In fact, in view of the guidance presently available covering the configuration of these telephones, one telephone may hop at twice the rate of the other. Thus, if two frequency hopping cordless telephones that are hopping at different rates and operating within reception range of each other happen to appear on the same channel at the same time, there is a likelihood of interference occurring between these two telephones. This interference could minimally cause a distortion of information and, at worst, a loss of synchronization between a handset or remote unit and an associated base unit of one and possibly both of these cordless telephones. This interference could continue as both cordless telephones continue to hop to and appear on this channel and possibly other common channels at the same time.

Another source of interference for a cordless telephone operating in a frequency hopping system is noise or other signal appearing continually on the channel hopped to by the cordless telephone. This type of interference will continue to interfere with the cordless telephone each time it hops to this channel.

As cordless telephones configured for frequency hopping operation increase in use, the likelihood of interference for such a telephone due to other telephones within its reception range being on the same channel at the same time will increase. And the interference from noise or other signal appearing on a channel in use by the frequency hopping telephone also will have an adverse effect on the operation of these telephones. It is therefore desirable to minimize the interference encountered by a cordless telephone from other cordless telephones and also noise and other signals while operating in a frequency hopping system.

SUMMARY OF THE INVENTION

In accordance with the invention, a cordless telephone arranged for operation in a frequency hopping system includes an arrangement which, in the presence of interference detected on certain communication channels, automatically selects and substitutes alternative communication channels to eliminate this interference, without disruption of communications between a handset unit in the cordless telephone and its associated base unit.

In accordance with a feature of the invention, either the handset unit or base unit determines the quality of signal communications between itself and its associated unit on each one of a first group of predetermined communication channels which are used for communications during a frequency hopping cycle. This quality of signal communication is determined by measuring the level of interference occurring on each one of the channels in this first group of channels.

In accordance with another feature of the invention, the cordless telephone selects one or more channels from a second group of predetermined communication channels. Each channel selected from this second group of channels is substituted for one of the channels in the first group of channels upon which the interference is detected during the frequency hopping cycle. Once the base unit or handset unit communicates to the other that a channel change is needed, the base unit selects the appropriate number of channels from the second group of channels and through a process acknowledged by the handset unit, communicates the alternative channel information to the handset unit. Once the information has been communicated and acknowledged, the base unit and the handset unit both substitute into the frequency hopping cycle these alternative communication channels for those communication channels upon which the interference was detected.

BRIEF DESCRIPTION OF THE DRAWINGS

The invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
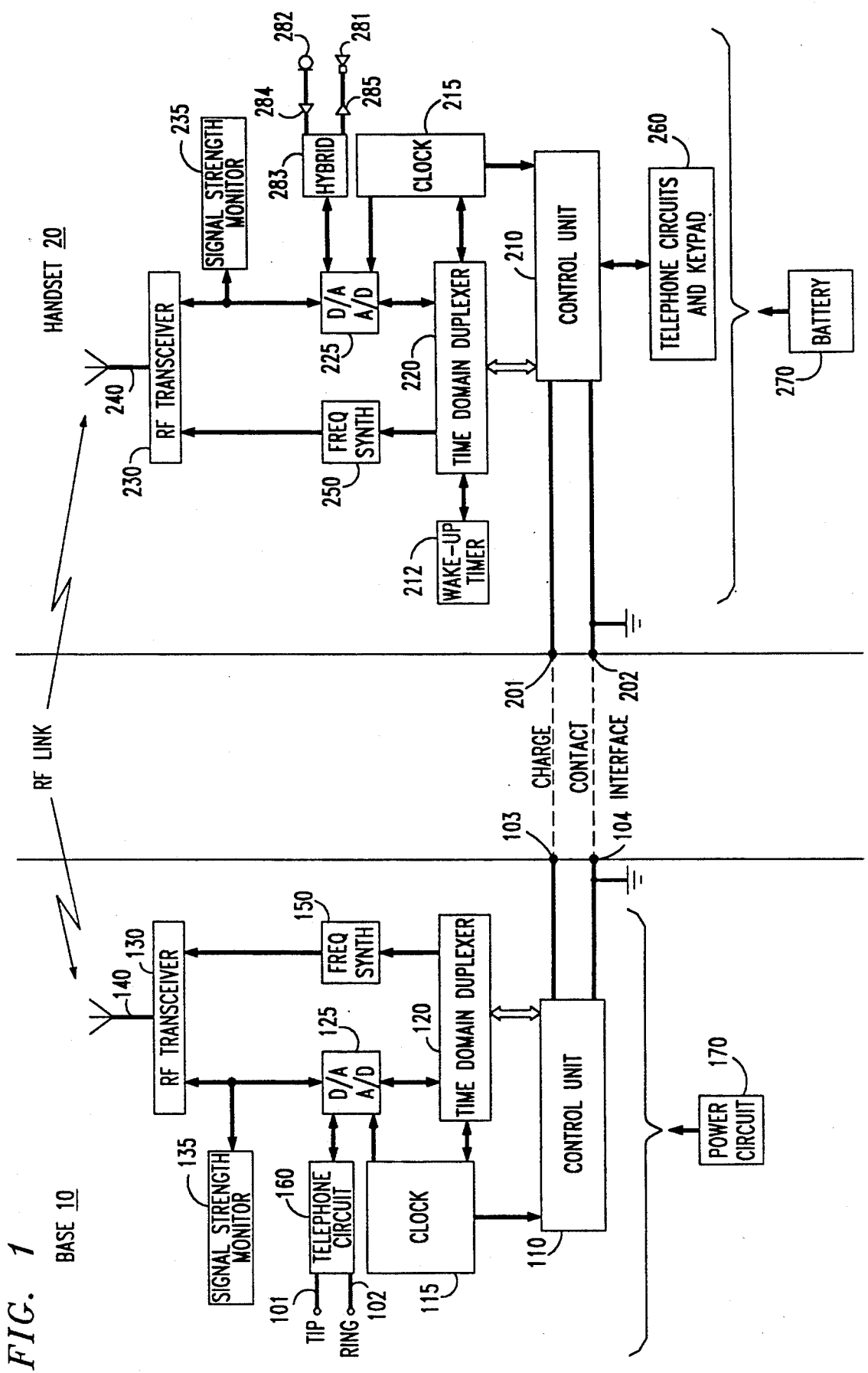
FIG. 1 is a functional block representation of a cordless telephone base unit and handset unit both operative in accordance with the principles of the present invention.

Referring now to FIG. 1 of the drawing, there is shown a general block diagram of certain circuitry of a cordless telephone that provides for automatically selecting alternative communication channels in response to interference such as noise or other signal sources detected on certain in-use communication channels. As shown, the cordless telephone generally comprises a base unit 10 and a handset unit 20 which are both operable over a plurality of communication channels in a frequency hopping system.

A general overview of spread spectrum technology including frequency hopping systems is provided by R. C. Dixon, Spread Spectrum Systems, New York: John Wiley & Sons, 1984. According to Dixon, a frequency hopping system or "frequency hopper" consists basically of a code generator and a frequency synthesizer capable of responding to the coded output from the code generator. Also, according to Dixon, "Frequency hopping" modulation is more accurately termed "multiple-frequency, code-selected, frequency shift keying." It is nothing more than FSK (frequency shift keying) except that the set of frequency choices is greatly expanded. Simple FSK most often uses only two frequencies; for example f1 is sent to signify a "mark," f2 to signify a "space." Frequency "hoppers," on the other hand, often have thousands of frequencies available. One real system described by L. M. Goodman et al. in The TATS Master-A Net Controller for Tactical Satellite Communications, has $2^{20}$ discrete frequency choices, randomly chosen, each selected on the basis of a code in combination with the information transmitted. The number of frequency choices and the rate of hopping from frequency to frequency in any frequency hopper is governed by the requirements placed on it for a particular use. The specific requirements for the frequency hopping system in which this cordless telephone is designed to operate are set forth in a Report and Order in General Docket No. 89-354, this Report and Order being adopted by the Federal Communications Commission on Jun. 14, 1990 and released on Jul. 9, 1990.

Included in the base unit 10 are a control unit 110, a clock 115 for providing synchronization to: 1) the control unit 110, 2) a time domain duplexer (TDD) 120 and 3) a combined digital-to-analog and analog-to-digital (D/A+A/D) converter 125. Also included in the base unit 10 is a radio frequency (RF) transceiver 130, a signal strength monitor circuit 135, an antenna 140 and a frequency synthesizer 150. A telephone circuit 160 in the base unit 10 connects this unit to a central office or other appropriate switch through tip and ring lines 101 and 102. The transceiver 130 comprise both an RF transmitter and an RF receiver. The transceiver 130 demodulates voice signals transmitted by the handset unit 20 and couples these signals via the D/A section of converter 125 to the telephone circuit 160. The transceiver 130 also has as its input speech and other control signals from the telephone circuit 160 which are first coupled through the A/D section of converter 125 before being transmitted to the handset unit 20 by this transceiver 130. The telephone circuit 160 serves as a "plain old telephone service" (POTS) interface for signals on the tip-ring lines 101 and 102 and for those signals received from the handset unit 20 by the RF transceiver 130. Finally a power circuit 170 provides operating power for all of the circuitry in the base unit 10.

The control unit 110 advantageously provides a number of control functions and may be implemented through the use of a microcomputer containing read-only-memory (ROM), random-access-memory (RAM) and through use of the proper coding. Such a microcomputer is known in the art and is readily available from semiconductor manufacturers such as Signetics, Intel and AMD.

The control unit 110 generates and stores security code data and also generates a pseudo random data list having a first group of 52 data values which correspond to a first set of 50 random channels and a second set of two random channels selected from 173 possible channels available in the 902-928 MHz frequency band. The first set of 50 random channels is used during a frequency hopping cycle executed in accordance with the Federal Communication Commission's General Docket No. 89-354. The second set of two random channels is used during an initialization process described in greater detail later herein.

In accordance with the invention, the control unit 110 also generates in a pseudo random manner a second group of, for example, 10 data values which correspond to a set of 10 random channels. These channels also are selected from the 173 channels available in the 902-928 MHz frequency band. If interference is detected by the base unit or the handset unit on any one or more of the first set of channels in the first group during the frequency hopping cycle, the affected unit initiates a channel change process whereby one or more channels are selected from the second group of channels for substitution for the channel or channels in the first group of channels upon which the interference was detected.

The security code data is generated while the handset unit 20 is in a mating cradle in the base unit 10 and is provided to the handset unit 20 in accordance with the teachings of U.S. Pat. No. 4,736,404 issued to R. E. Anglikowski, et al. on Apr. 5, 1988. The security code data stored in control unit 110 is transmitted between the base unit 10 and the handset unit 20 via a battery charge contact interface formed by contacts 103 and 104 located on the base unit which interface with contacts 201 and 202 located on the handset unit 20. The security code, provided during an initialization process described later herein, is transmitted while establishing initial communications or call set-up during the time that the handset unit 20 is located remote from the base unit 10 as well as during the transfer of subsequent opcode data between these units during ongoing communications.

Like the security code data, the pseudo randomly generated data list is generated when the handset unit 20 is in the mating cradle in the base unit 10. The data list, which includes the first group of 52 data values, also is transmitted between the base unit 10 and the handset unit 20 via the battery charge contact interface during the initialization process. The second group of 10 data values are retained in the base unit 20 for use as needed, as described in further detail later herein. It will become apparent to those skilled in the art that the pseudo randomly generated data list alternatively could be generated in the handset unit 20 and transmitted to the base unit 10 via the battery charge contact interface during the initialization process without departing from the spirit and scope of this invention. Similarly, it also will become apparent that the second group of data values could be generated and retained in the handset unit 20 without departing from the spirit and scope of the invention. The first and second group of data values may be generated in a pseudo random manner. Pseudo random generator arrangements are well-known in the art, and any one may be employed to produce a pseudo-randomly generated data list that contain the first and second group of data values. Such list may be generated, for example, in accordance with the teaching of S. W. Golomb in Digital Communications With Space Applications (New Jersey: Prentice-Hall 1964) pp. 7-15.

The control unit 110 also controls and configures the TDD 120. The pseudo randomly generated data list from the control unit 110 is provided to the TDD where it is stored therein. The TDD 120, in turn, controls the frequencies selected in the frequency hopping cycle of the base unit 10 by inputting into the frequency synthesizer 150 at the appropriate time the values stored in the data list generated by the control unit 110. The TDD 120 also refreshes the frequency synthesizer 150 as the synthesizer progresses through the frequency hopping cycle.

In order for the base unit 10 to achieve effective coverage throughout its operating range, the signal strength monitor circuit 135 continually monitors the strength of the received signal from the handset unit 20 during ongoing communications with the handset unit 20. This signal strength monitor circuit 135 may be, for example, a received signal strength indicator (RSSI) circuit. This RSSI circuit produces an output voltage that is proportional to the strength of the received signal from the handset unit 20.

Responsive to the strength of the received signal from the handset unit 20, as determined by the signal strength monitor 135, the control unit 110 regulates the amount of power transmitted by the RF transceiver 130 to the handset unit 20. Thus when the handset unit 20 is in close proximity to the base unit 10, the level of power radiated by the RF transceiver 130 is reduced to a minimum acceptable level. And when the handset unit 20 is determined to be located near the fringe of the telephone's operating range, the level of power radiated by RF transceiver 130 is increased to its maximum permitted level.

Referring next to the handset unit 20, components in this unit include a control unit 210, a wake-up timer 212 and a clock 215 for providing synchronization to: 1) the control unit 210, 2) a time domain duplexer (TDD) 220 and 3) a combined digital-to-analog and analog-to-digital (D/A+A/D) converter 225. Also included in the handset unit 20 are an RF transceiver 230, a signal strength monitor circuit 235, an antenna 240 and a frequency synthesizer 250. A telephone circuits and keypad section 260 permits dialing telephone digits and selecting such functions as talk, intercom and page modes for the handset unit 20 to communicate with the base unit 10. A battery 270 provides operating power for all the circuitry in the handset unit 20. This battery is charged by the power circuit 170 via the charge contact interface 103, 104 and 201, 206 formed when the handset unit 20 is placed in the mating cradle of the base unit 10.

The transceiver 230 comprises both an RF transmitter and an RF receiver. This transceiver 230 demodulates voice signals transmitted by the base unit 10 and couples these signals via the D/A section of converter 225 and a hybrid 283 on to a loudspeaker 281. The transceiver 230 also has as its input analog speech signals from a microphone 282 which it transmits to the base unit 10. These analog speech signals are coupled to the transceiver via the hybrid 283 and the A/D section of converter 225. This converter converts the analog signal to a digital signal which is then provided to the RF transceiver 230. Conventional amplifiers 284 and 285 are employed for respectively amplifying the analog speech signals obtained from the microphone 282 and provided to the loudspeaker 281. The signal strength monitor 235 monitors the received signal level from the base unit 10 and accordingly varies the level of the output power radiated by the RF transceiver 230 in proportion to this received signal level.

With reference to the initialization process, this is the process that configures the handset unit 20 for communicating with the base unit 10 and takes place when the handset unit is placed in the mating cradle of the base unit 10. Included in the telephone circuit and keypad section 260 is an in-cradle detector (not shown) for detecting when the handset unit is inserted in the mating cradle on the base unit. This in-cradle detector also signals the control unit 210 whenever the handset unit 20 is inserted in the cradle. During the initialization process, the control unit 210 interfaces with and communicates with the control unit 110 in the base unit 10. As a part of this communication, the control unit 210 receives the pseudo randomly generated data list and the security code data from the control unit 110 over the charge contact interface 103, 104 and 201, 202. Once this data has been received, the control unit 210 acknowledges receipt of the data by echoing this same data back to the base unit 10 via the charge contact interface.

Any communications between the base unit 10 and the handset unit 20 must be accompanied by the security code then shared between them. During the establishing of initial communications between the handset unit 20 and the base unit 10 initiated by the base unit 10, the control unit 210 must be able to make a favorable comparison of the received security code data with its stored security code data. Similarly, a favorable comparison of the data from the two security codes also must be made by control unit 110 in order for the base unit 10 to respond to a call set-up request from a handset unit. Like the control unit 110, the control unit 210 may be implemented through the use of a microcomputer containing ROM, RAM and through use of the proper coding. Such a microcomputer is known in the art and is readily available from semiconductor manufacturers such as Signetics, Intel and AMD.

While the handset unit 20 is not being used for communications and is located remote from the base unit 10, the handset unit 10 enters a low power monitoring mode which includes powering down and then powering up certain minimum circuitry in the handset unit 20 as necessary for satisfactory operation. Reducing the on-time state of this circuitry aids in conserving battery power when no communications are in progress between the handset unit and the base unit. Also, other circuitry in the handset unit 20 is turned completely off while the handset unit is in this monitoring mode. In powering down the handset unit 20, the control unit 210 turns itself off or puts itself to sleep and signals the TDD 220 also to turn off while in the powered down state. Before turning off, the TDD 220 activates wake-up timer 212, which comprises, for example a one-shot-monostable-multivibrator, and turns off all other clock-driven circuitry in the handset unit 20. After approximately 360 milliseconds, the handset unit 20 is powered up into a minimum power operating state for 40 milliseconds. This change of state is initiated by a pulse provided to the TDD 220 from wake-up timer 212 at the end of the 360 milliseconds. The TDD 220 is enabled thereby and, in turn, turns on the control unit 210, the clock 215 and the receiver portion of the transceiver 230 for determining if an RF signal is being transmitted from the base unit 10 or if a key has been pushed on the keypad in the handset unit 20. If neither of these has occurred, the control unit 210 again turns off power to itself and to the TDD 220, and the cycle is repeated. This low power monitoring mode continues as long as an RF signal is not received from the base unit 10 or a key is not pushed on the keypad.

When an RF signal is received from a base unit, this signal is coupled to the control unit 210 which looks for an initialization synchronization (sync) pattern in the signal within the 40 milliseconds that the handset unit is powered up to its minimum power operating state. If the received initialization sync pattern does not contain the security code that is recognized by the handset unit, the control unit 210 turns off power to itself and to the TDD 220. If the initialization sync pattern does contains the security code that is recognized by the handset unit, however, the control unit 210 causes the low power monitoring mode to be overridden. In so doing, the control unit 210 continues to enable the TDD 220 beyond its normal ON time in order to establish synchronization with the RF signal being received from the base unit. The low power monitoring mode of the handset unit 20 also is overridden by certain key pushes on the keypad as well as when the handset unit is placed into the mating cradle in the base unit 10 so that an exchange of data between the handset unit and base unit can take place through the battery charge contact interface then existing there between.

Communications between the base unit 10 and the handset unit 20 occur in time periods designated as transmission frames. In a frame, the base unit and the handset unit both transmit to each other. A typical transmission frame may be, for example, 5 milliseconds in length and contain time slots for approximately 500 bits of information. In operation, the base unit generally transmits in the first half of each frame of for 2.5 milliseconds and is then reconfigured to receive a signal from the handset unit which transmits in the second half of each frame or for 2.5 milliseconds on the same frequency. The handset unit operates in complementary fashion to the base unit in that it receives in the first half of each frame and is reconfigured to transmit in the second half of each frame. This cyclic frame transmission generates 80 frames in approximately 400 milliseconds with the base unit and handset unit both transmitting on each of the 50 communication channels.

Both the base unit and the handset unit may initiate a call to each other. As earlier indicated, channels 50 and 51 in the first group of channels are the channels used for initiating communications between the base and handset units. When the base unit 10 is initiating a call to the handset unit 20, the base unit sends the initialization synchronization pattern on channel 51 in the first part of each frame for 400 milliseconds. When the handset unit is initiating a call to the base unit, the handset unit also sends this same initialization synchronization pattern on channel 51 but in time periods equal to the second part of each frame for 120 milliseconds. This synchronization pattern comprises a dotting sequence signal, followed by a security code, a barker code and a period in which no information is transmitted as discussed later herein.

The dotting sequence signal is a series of one and zeros that are provided for enabling the handset unit 20, and also the base unit 10, to align the phase of its receive clock with the phase of the clock providing the incoming signal. When the phase of these clocks is aligned, the handset unit is then able to read in the proper bit boundary the security code and barker code that follow the dotting sequence signal.

When attempting to contact the handset unit, the base unit sends 198 bits of the dotting sequence signal followed by the security code. This security code is a 16 bits random number generated by the base unit and, as earlier indicated, is transferred to the control unit 210 in the handset unit 20 over the battery charge contacts while the handset unit is in the cradle of the base unit 10. This shared security code guards against another base unit inadvertently synchronizing with this handset unit.

The security code is followed in the initialization synchronization pattern by the barker code. This barker code is a fixed predetermined eight-bit pattern which provides a position reference in a frame for aligning a frame clock of the receiver in the handset unit with the frame clock of the transmitter in the base unit. This permits the handset unit 20 to re-establish frame sync or frame phase with the base unit 10 after the handset unit has been turned off during its low power monitoring mode of operation. When aligning with the handset unit 20, a frame clock in the receiver of the base unit 10 must similarly be aligned with a frame clock of the transmitter in the handset unit.

After the base unit 10 transmits the security code and barker code in the initialization sync pattern, no additional information is sent by the base unit in each frame for a time period equal to 30-bits. A delay is provided in this time period for certain internal processing to occur, including, for example, the reconfiguring of the frequency synthesizer 150 for receiving the initialization sync pattern from the handset unit 20.

Once the alignment of the frame position of the handset unit receiver with the base unit transmitter has been achieved, synchronization for the handset unit is established. Similarly, the alignment of the frame position of the base unit receiver with the handset unit transmitter also establishes synchronization for the base unit.

During ongoing communications and in accordance with the invention, either the base unit 10 or the handset unit 20 is able to determine the quality of signal communications between itself and its associated unit on each one of the first group of predetermined communication channels which are used during the frequency hopping cycle. This is achieved by each of these units by examining a set of received parameters contained in its received signal and then comparing this set of received parameters with a common set of stored parameters that are contained in both of these units. A favorable comparison of the received parameters with the stored parameters is indicative of good quality signal communications and an unfavorable comparison of these two parameters is indicative of poor quality signal communications. More specifically, this quality of signal communications is determined by providing a measure of the number of security code and barker code bits that are received incorrectly in a frame in either the base unit or the handset unit while on each channel. Both the TDD 120 in the base unit 10 and the TDD 220 in the handset unit 20 are configured for detecting and comparing in each channel the received bits of the security code and the barker code received from each other. If these bits are not received or the bits received in reception time slots reserved for these bits in the frame are different from what was expected, the TDD receiving this discrepancy determines that the channel over which it is then communicating is being interfered with in that it contains noise or other unrecognizable signals. The TDD receiving this signal then informs its associated control unit that an interfering signal has appeared on the present channel and that this channel should be monitored for reoccurrence of this interference. The control unit stores each one of the interfering occurrences for this channel up to, for example, 50 occurrences after which the control unit starts a process which allows the base unit 10 and the handset unit 20 to remove this channel from the frequency hopping cycle and replace it with a selected channel from the second group of channels.

Figure 2:
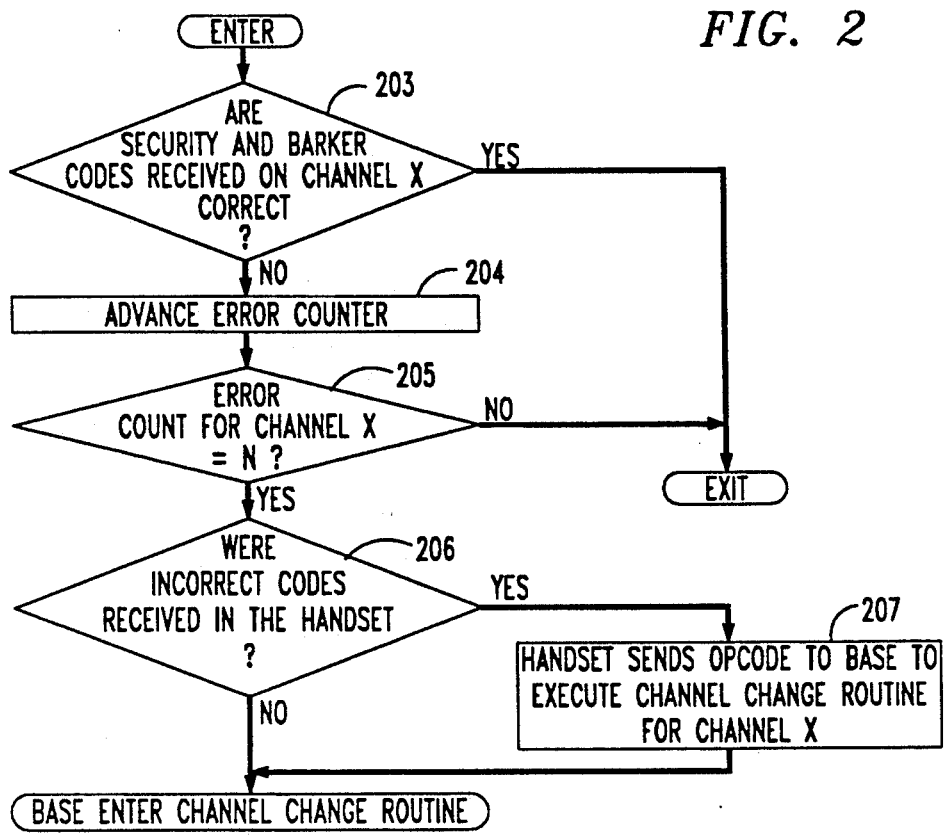
FIG. 2 shows the protocol of the cordless telephone depicting the specific process within the base unit or the handset unit in the cordless telephone in response to interference detected on a communication channel, in accordance with the invention.

Referring next to FIG. 2, there is shown the protocol of the cordless telephone depicting the specific process operable within either the handset or the base unit, such protocol being responsive to interference detected on a communication channel. The protocol begins at decision 203 where both the base unit 10 and the handset unit 20 separately check to determine if the received security and barker codes received on channel X are correct. If these codes are received correctly in this step, the protocol is exited. If these codes are not received correctly by either the handset unit or the base unit, however, an error counter in the control unit of the associated handset unit or base unit is advanced one count in accordance with step 204 for each time the security code and barker codes are received incorrectly. The process next advances to decision 205 where the total error count for channel X is determined. If the error count has advanced to a count N, where N is, for example, equal to 50, the protocol advanced to step 206. If however, the error count for channel X has not advanced to N, the protocol is exited. Each one of the channels in the first set of the first group of communication channels is monitored in this manner for errors received in the security and barker codes.

At decision 206, it is determined whether the incorrect codes were received in the handset unit 20. If so, then the base unit has to be instructed to execute the channel change routine which resides in the base unit. This routine is described later herein with reference to FIGS. 3 and 4. The protocol thus advances to step 207 where the handset unit 20 sends an opcode to the base unit informing the base unit to execute the channel change routine for substituting another channel in the time slot occupied by channel X. From step 207 the protocol is exited and the base unit enters the channel change routine. If in decision 206, the incorrect codes received were not in the handset unit, then they would have been received in the base unit and thus from the NO branch of this decision the protocol also enters the base unit channel change routine.

Figure 3:
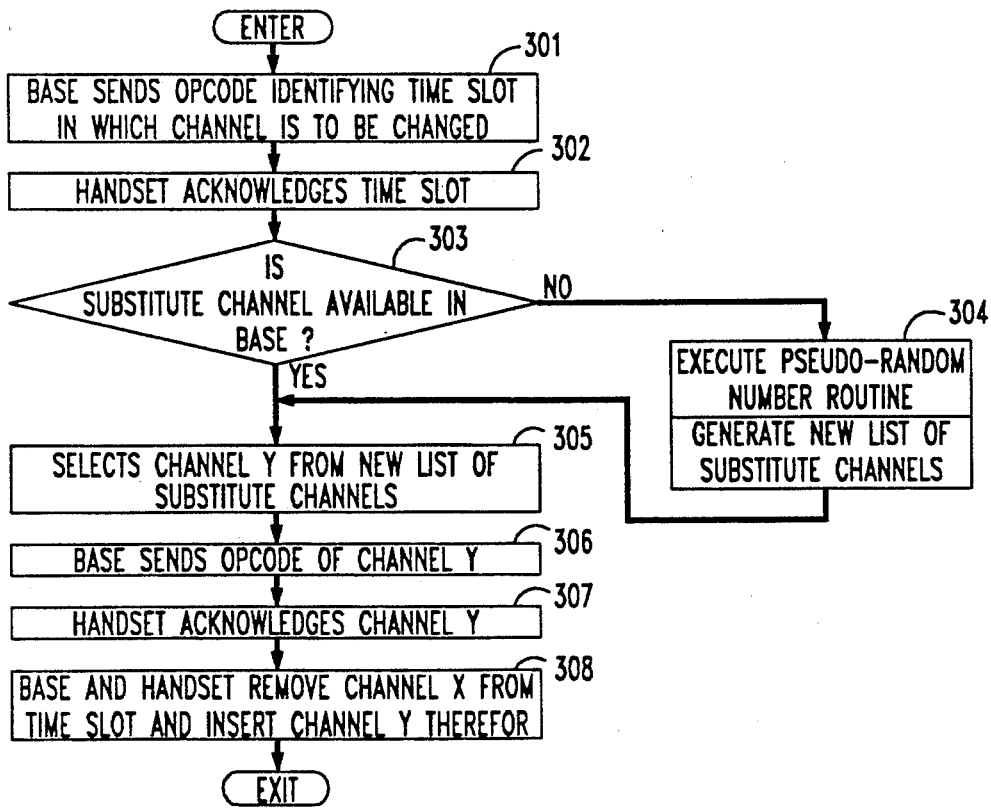
FIG. 3 shows the protocol of the cordless telephone depicting the specific interaction between the base unit and the handset unit in executing a channel change routine, in accordance with the invention.

Referring next to FIG. 3 there is shown the protocol of the cordless telephone depicting the specific interaction between the base unit and the handset unit in executing a channel change routine. The protocol begins at step 301 where the base unit 10 sends an opcode to the handset unit identifying the time slot in which the channel is to be changed. From step 301 the protocol advances to step 302 where the handset unit acknowledges the time slot by transmitting back to the base unit this opcode reflective of this time slot. From step 302 the protocol advances to decision 303 where it is determined if a substitute channel is available in the base unit for substituting into the time slot identified by the base unit. If a substitute channel is available in the base unit at step 303 the protocol advances to step 305. If a substitute channel is not available in the base unit, however, the protocol advances to step 304 where the base unit executes a pseudo random number routine whereby it generates a new list, typically 10, of substitute channels. The channels in this new list are necessarily different from those previously generated in the first and second group of channels, this process for generating these two groups of channels being described earlier herein. As the requirement for new substitute channels appear, the random number routine will generate new channels in each subsequent list until all the unused and available channels have been exhausted. Once all available channels have been used once, the random number routine recycles the previously used channels in an attempt to identify channels that will not be interfered with by noise or other signals. From step 304 the protocol advances to step 305.

At step 305 the base unit selects a channel Y from the new list of substitute channels. The protocol next advances to step 306 where the base unit sends the opcode indicative of channel Y to the handset unit. The protocol next advances to step 307 where the handset unit acknowledges receipt of channel Y back to the base unit. From step 307 the protocol advances to step 308 where the base and handset unit both remove channel X from the time slot and insert channel Y in this time slot. From step 308 the protocol is excited.

Figure 4:
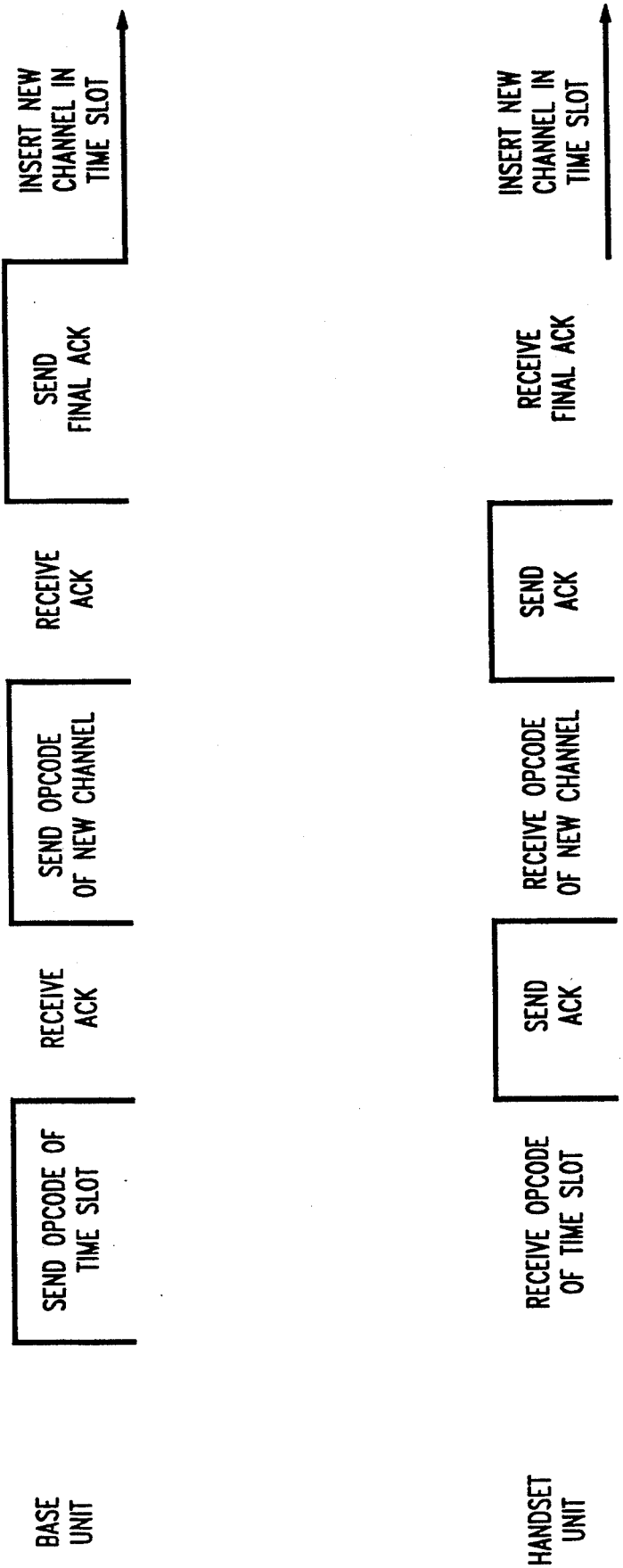
FIG. 4 shows in detail certain aspects of the protocol depicted in FIG. 3 for operation of the channel change routine in accordance with the invention.

With reference to FIG. 4 there is shown in further detail certain aspects of the protocol depicted in FIG. 3 for operation of the channel change routine. Once the base unit has either decided to change or been requested to change the channel in a time slot because of interference received in this time slot, the base unit sends the opcode representative of the time slot to the handset unit and the handset unit receives this opcode reflecting this time slot. The handset in turn sends an acknowledge (ACK) signal which includes the opcode of the time slot back to the base unit. The base unit next sends the opcode of the new channel to the handset unit. In turn, the handset unit sends an ACK signal which includes the opcode of the new channel. The base unit then sends the final ACK signal to the handset unit. After receipt of this final ACK signal, both the handset unit and base unit insert the new channel in the designated time slot and continue with the frequency hopping routine which then includes this new channel.

Various other modifications of this invention are contemplated and may obviously be resorted to by those skilled in the art without departing from the spirit and scope of the invention as hereinafter defined by the appended claims.

We claim:

1. A method of communicating between a base unit and a handset unit in a cordless telephone employed in a frequency hopping system, the base unit and the handset unit being capable of communicating over any one of a plurality of communication channels, the method comprising the steps of:

detecting in the handset unit interference occurring between the base unit and the handset unit while communicating on at least one of a first group of predetermined communication channels within the plurality of communication channels, the first group of predetermined communication channels being used for communication between the base unit and the handset unit during a frequency hopping cycle, and wherein the detecting step includes a step of determining a quality of signal communications between the base unit and the handset unit, and the determining step includes a step of examining a set of received parameters contained in a signal received during communications on each one of the first group of predetermined communication channels, the quality of signal communications between the base unit and the handset unit being determined by a comparison of this set of received parameters with a set of stored parameters within the handset unit and base unit, a favorable comparison of the set of received parameters with the set of stored parameters being indicative of a correctly received and good quality signal and an unfavorable comparison of these two sets of parameters being indicative of an incorrectly received and poor quality signal containing interference;

transmitting from the handset unit to the base unit information indicative of communication channel interference detected at the handset unit for requesting at least one substitute communication channel for said at least one communication channel upon which interference is detected; and selecting in the base unit one or more communication channels from a second group of predetermined communication channels within the plurality of communication channels for substituting for each communication channel in the first group of predetermined communication channels upon which interference is detected during the frequency hopping cycle.

2. The method of claim 1 wherein the set of received parameters comprises a security code and a barker code contained in the received signal.

3. The method of claim 1 further comprising a step of incrementing a variable with each unfavorable comparison between the set of received parameters and the set of stored parameters.

4. The method of claim 3 wherein responsive to the incrementing step reaching a predetermined number, the selecting step selecting one of the communication channels from the second group of channels for substituting for the communication channel in the first group containing the interference.

5. The method of claim 1 further comprising the step of generating the second group of predetermined communication channels from the plurality of communication channels, the generating step further including the step of pseudorandomly selecting additional channels for use in the second group of predetermined communication channels from the plurality of communication channels.

6. The method of claim 5 wherein the additional channels selected from the plurality of communication channels by the generating step are those not previously selected and included in the first group of predetermined communication channels and those not previously selected and included in the second group of predetermined communication channels.

7. The method of claim 6 further comprising a recycling step, responsive to the generating step selecting all available channels from the plurality of communication channels, the recycling step recycling all of the previously used channels for reuse by the selecting step.

8. An arrangement for providing communications between a base unit and a handset unit in a cordless telephone employed in a frequency hopping system, the base unit and the handset unit being capable of communicating over any one of a plurality of communication channels, the arrangement comprising:

means in the handset unit for detecting interference occurring between the base unit and the handset unit while communicating on at least one of a first group of predetermined communication channels within the plurality of communication channels, the first group of predetermined communication channels being used for communication between the base unit and the handset unit during a frequency hopping cycle, the detecting means including means for determining the quality of signal communications between the base unit and the handset unit, and the determining means including means for examining a set of received parameters contained in a signal received during communications on each one of the first group of predetermined communication channels, the determining means further including comparison means for comparing the quality of signal communications between the base unit and the handset unit by comparing the set of received parameters with a set of stored parameters within the handset unit and base unit, a favorable comparison of the set of received parameters with the set of stored parameters being indicative of a correctly received and good quality signal and an unfavorable comparison of these two sets of parameters being indicative of an incorrectly received and poor quality signal containing interference;

means in the handset unit for transmitting to the base unit information indicative of communication channel interference detected at the handset unit for requesting at least one substitute communication channel for said at least one communication channel upon which interference is detected; and means in the base unit for selecting one or more communication channels from a second group of predetermined communication channels within the plurality of communication channels for substituting for each communication channel in the first group of predetermined communication channels upon which interference is detected during the frequency hopping cycle.

9. The arrangement of claim 8 wherein the set of received parameters comprises a security code and a barker code contained in the received signal.

10. The arrangement of claim 8 further comprising counter means, the counter means being incremented after each unfavorable comparison between the set of received parameters and the set of stored parameters.

11. The arrangement of claim 10 wherein responsive to the counter means incrementing to a predetermined number, the selecting means selecting one of the communication channels from the second group of channels for substituting for the communication channel in the first group containing the interference.

12. The arrangement of claim 8 further comprising means for generating the second group of predetermined communication channels from the plurality of communication channels, the generating means including means for pseudo-randomly selecting additional channels for use in the second group of predetermined communication channels from the plurality of communication channels.

13. The arrangement of claim 12 wherein the additional channels selected from the plurality of communication channels by the generating means are those not previously selected and included in the first group of predetermined communication channels and those not previously selected and included in the second group of predetermined communication channels.

14. The arrangement of claim 13 further comprising recycling means, responsive to the generating means selecting all available channels from the plurality of communication channels, the recycling means recycling all of the previously used channels for reuse by the selection means.

15. An arrangement for providing communications between a base unit and a handset unit in a cordless telephone employed in a frequency hopping system, the base unit and the handset unit being capable of communicating over any one of a plurality of communication channels, the arrangement comprising:

means in the base unit for detecting interference occurring between the base unit and the handset unit while communicating on at least one of a first group of predetermined communication channels within the plurality of communication channels, the first group of predetermined communication channels being used for communication between the base unit and the handset unit during a frequency hopping cycle;

means in the base unit for selecting one or more communication channels from a second group of predetermined communication channels within the plurality of communication channels for substituting for each communication channel in the first group of predetermined communication channels upon which interference is detected during the frequency hopping cycle; and the detecting means including means for determining the quality of signal communications between the base unit and the handset unit, the determining means including means for examining a set of received parameters contained in a signal received during communications on each one of the first group of predetermined communication channels, the determining means further including comparison means for comparing the quality of signal communications between the base unit and the handset unit by comparing the set of received parameters with a set of stored parameters within the handset unit and base unit, a favorable comparison of the set of received parameters with the set of stored parameters being indicative of a correctly received and good quality signal and an unfavorable comparison of these two sets of parameters being indicative of an incorrectly received and poor quality signal containing interference.

* * * * *